DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 9, 1971

884 O.G. 433

T884,002

TRUNK MAT FOR AUTOMOBILES

Charles L. King, Wilmington, Del., assignor to E. I. du Pont de Nemours and Company, Wilmington, Del.

Filed Aug. 25, 1969, Ser. No. 852,942

Int. Cl. B32b *3/26, 7/02*

U.S. Cl. 161—160

No Drawing. 6 Pages Specification

An improved trunk mat for automobiles comprising:

(1) a first layer of a fabric which permits wicking when in contact with water, (2) a core layer of a foam sheet of a polymer having a work-to-break value of at least 10,000 in.-lbs./in.$^3$, the foam sheet consisting essentially of polyhedral shaped closed cells whose median diameter is at least 500 microns, the foam sheet having a maximum density of 0.03 gram/cc. and a specific work-to-tear value of at least 250 in.-lbs./in.$^2$, and (3) a layer of thermoplastic film, the several layers being bonded to each other in the order specified to form a unitary laminar structure.

The laminated mat has the following pictorial structure:

| |
|---|
| Top layer—Thermoplastic film |
| Core—Foam |
| Bottom layer—Fabric |